United States Patent
Árendás (10) Patent No.: US 9,167,516 B2
(45) Date of Patent: Oct. 20, 2015

(54) SYSTEM AND METHOD FOR WIRELESS SENSOR NETWORKS

(76) Inventor: Csaba Árendás, Muzla (SK)

(*) Notice: Subject to any disclaimer, the term of this patent is extended or adjusted under 35 U.S.C. 154(b) by 244 days.

(21) Appl. No.: 13/582,579

(22) PCT Filed: Mar. 3, 2011

(86) PCT No.: PCT/IB2011/000429
§ 371 (c)(1),
(2), (4) Date: Sep. 4, 2012

(87) PCT Pub. No.: WO2011/107856
PCT Pub. Date: Sep. 9, 2011

(65) Prior Publication Data
US 2012/0327831 A1   Dec. 27, 2012

Related U.S. Application Data

(60) Provisional application No. 61/310,517, filed on Mar. 4, 2010.

(51) Int. Cl.
*H04W 52/02* (2009.01)
*H04W 84/18* (2009.01)

(52) U.S. Cl.
CPC .......... *H04W 52/0216* (2013.01); *H04W 84/18* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,792,126 B1 * | 9/2010 | Montestruque et al. | 370/400 |
| 2004/0239524 A1 | 12/2004 | Kobayashi | |
| 2008/0108396 A1 * | 5/2008 | Lundqvist | 455/574 |
| 2012/0297226 A1 * | 11/2012 | Mucignat et al. | 713/323 |

FOREIGN PATENT DOCUMENTS

WO   2008056023   5/2008

OTHER PUBLICATIONS

Niyato et al., "Wireless Sensor Networks With Energy Harvesting Technologies: A Game-Theoretic Approach to Optimal Energy Management", IEEE, Aug. 2007.*
Wang, et al. "An Energy-Efficient ASIC With Real-Time Work-On-Demand for Wireless Body Sensor Network." Electron Devices and Solid-State Circuits, 2008.
Sliva. "Technologies Used in Wireless Sensor Networks." Systems, Signals and Image Processing, 2008.

* cited by examiner

*Primary Examiner* — Habte Mered
(74) *Attorney, Agent, or Firm* — Nina Habib Borders; Reed Smith LLP (57) ABSTRACT

Wireless sensor networks includes nodes configured to operate according to an 802.11-compliant communication protocol in an ad hoc mode in a multi hop network. The nodes include a power management unit configured to control operating states of a sensor control unit, a computing and storage unit and a communication unit of the node so that sensor measurements and inter-node communications occur at designated, coordinated times.

13 Claims, 6 Drawing Sheets

SYSTEM AND METHOD FOR WIRELESS SENSOR NETWORKS

RELATED APPLICATIONS

This application is a national stage application under 35 U.S.C. 371 of International Application No. PCT/IB2011/000429, filed Mar. 3, 2011, which claims priority to provisional U.S. patent application No. 61/310,517, filed 4 Mar. 2010, the contents of which are incorporated by reference herein in their entireties.

TECHNICAL FIELD

The principles of the present invention are directed to wireless sensor networks and, in one particular embodiment, such networks as employ communications protocols compatible with those promulgated under the Institute for Electrical and Electronics Engineers (IEEE) 802.11 and "WiFi" family of standards.

BACKGROUND

The world of wireless telecommunications is rapidly evolving. The need for a variety of data delivery mechanisms has led to a number of different communication protocols being established. Among the more familiar such communication protocols for wireless applications are amplitude modulation (AM) and frequency modulation (FM), for radio; global system for mobile communications (GSM), general packet radio service (GPRS) and international mobile telecommunications 2000 (IMT-2000 or 3G), for mobile phones; and a number of protocols based on various IEEE standards, such as 802.11 (WiFi), 802.15.1 (Bluetooth), 802.15.3 (ultra wide band), and 802.16 (WiMax). All such communication protocols offer wireless communication services for different and specific purposes. See e.g., Y. W. S. J. S. Lee and C. C. Shen., "*A comparative study of wireless protocols: bluetooth, uwb, zigbee, and wi-fi*," in Proceedings of the 33rd Annual Conference of the IEEE Industrial Electronics Society (IECON), volume 46-51, November 2007.

Among the applications for wireless communications protocols, a promising emerging technology is the wireless sensor network (WSN). The goal of such networks is to connect things rather than people. There are several applications for such technology, including a so-called SmartHome, which imagines a home in which virtually every electronic device is part of a wireless network for energy control, central administration and comfort. Other applications for WSNs include precision agriculture, such as irrigation management; urban monitoring; and air pollution monitoring. Practical use of wireless sensor networks have been described e.g., in J. Panchard, "*Wireless sensor networks for marginal farming in India.*" PhD thesis, Lausanne, 2008; "Wireless distributed sensing system for environmental monitoring," available at the Sensorscope project web page of the Ecole Polytechnique Federale de Lausanne.

WSNs are appropriate for those areas where many measurements are necessary in both space and time, and areas where one sensor station is inadequate for monitoring owing to the differing environmental factors and nature of the measurements varying even over short distances. The diversity and complexity of microclimatic variables is described e.g., in P. J. M. J. B. L. Hernandes, J. L., "*Seasonal differences among microclimatic variables from environments of forest interior, vineyard and standard weather station at jundia, brazil.*" publication, Centro Avanado de Pesquisa Tecnolgica do Agronegcio de Frutas, IAC, Caixa Postal 11, 13200-970 Jundia (SP), Brazil. Usually measurements in these areas require full autonomy of a WSN node. Low energy consumption and battery operation is usually also a requirement.

Several solutions to this problem have been proposed. ZigBee (IEEE 802.15.4) is one such solution. However, the ZigBee approach, among others, proposes a new system design, including new software, hardware and communication protocol components. See e.g., H. S, Bhavneet Sidhu and A. Chhabra, "*Emerging wireless standards—wifi, zigbee and wimax*," World Academy of Science, Engineering and Technology 25 2007, Such bottom-up design was intended to address WSN requirements tor extreme long battery life, measured in at least months if not in years, are unlike those faced by previous communication protocols and devices. The adoption of a communications protocol, not widely used, and one which requires new software and hardware, would pose a huge cost to manufacturers, owners and users of ubiquitous 802.11-compliant family for products.

SUMMARY OF THE INVENTION

One embodiment of the invention includes a Wireless System Network (WSN) communication node, which comprises a power supply unit designed to supply electrical power for the node, a power management unit coupled to receive power from the power supply unit, a sensor control unit configured to interface with one or more sensors, a computing and storage unit configured to manage processing and storage of data gathered by the sensors, and a communication unit having a communication adapter configured to operate under instruction from the computing and storage unit, according to an 802.11-compliant communication protocol. The communication node may operate in an ad hoc mode in a multi hop network. The power management unit may be configured to control operating states of the sensor control unit, the computing and storage unit and the communication unit according to a wireless sensor network communication protocol in which sensor measurements and inter-node communications occur at designated times.

In one embodiment of the invention, the power supply of the communication node can be supplied by either battery power, solar power or a combination of both battery and solar.

In an embodiment of the invention where the power supply comes from a solar panel, the power supply unit further comprises a solar charging unit, wherein the solar charging unit is further coupled to one or more batteries and configured to charge the batteries using electrical power produced by the solar panel.

Another embodiment of the invention includes a method for operating a communication node in a WSN, comprising the steps of providing electrical power from a power supply unit of the communication node to a power management unit of the communication node, activating, by the power management unit, at a designated time, a sensor control unit of the communication node and acquiring data provided by a sensor controlled by the sensor management unit, said data being buffered by the power management unit, placing the sensor control unit in a low power consumption state and powering up, at the direction of the power management unit, a computing and storage unit of the communication node and transferring the data from the power management unit to the computing and storage unit and storing the data in a memory accessible by the computing and storage unit. Further, at a designated time for communication of the data, under the control of the power management unit, placing an 802.11-compliant communication protocol communication adapter of a communication unit of the communication node in an operational state and transmitting the data from the computing and storage unit to another node of the communication network and subsequently placing the communication unit in a low or off power consumption state; otherwise, placing the computing and storage unit in a low or off power consumption state.

In another embodiment of the invention the communications method involves synchronizing the startup times of the various communication nodes, whereby the communications node, prior to the communication unit transmitting the data from the computing and storage unit to another node of the communication network, synchronizes a real time clock of the power management unit with a master clock of a node of the communication network. In some embodiments, the synchronization is performed using a network time protocol. In others embodiments, the master clock is selected according to a selection protocol.

In another embodiment of the invention pertaining to the method of operating a communications node, the method involves the step wherein prior to placing the computing and storage unit in a low power consumption state, storing data received from another node in the communication network.

In yet another embodiment of operating the communications node, the method involves the step wherein prior to transmitting the data, constructing a routing table of other nodes in the communication network.

Another embodiment of the invention includes a WSN system, comprising communication nodes; the communication nodes further comprising: a power supply unit designed to supply electrical power for the node; a sensor control unit configured to interface with one or more sensors; a computing and storage unit configured to manage processing and storage of data gathered by the sensors; a communication unit having a communication adapter configured to operate, under instruction from the computing and storage unit, according to an 802.11-compliant communication protocol in an ad hoc mode in a multi hop network; and a power management unit coupled to receive power from the power supply unit and configured to control operating states of the sensor control unit, the computing and storage unit and the communication unit according to a wireless sensor network communication protocol in which sensor measurements and inter-node communications occur at designated times. The sensor measurements, transformed into machine-readable data, are communicated to a computing device over said inter-node communications and displayed to a user of the wireless sensor network system on a computing device.

In another embodiment, the WSN system has sensors which can measure one or more factors, including temperature, humidity, leaf wetness, infra-red light, solar radiation, wind speed wind direction, precipitation, soil moisture, soil pressure, pH, oxygen, carbon dioxide and ozone.

In one embodiment, the WSN system power supply is powered by batteries. In another embodiment, the power supply includes solar panels, wherein the solar panels are coupled to a solar charging unit and the solar charging unit is further coupled to the one or more batteries and is configured to charge the batteries using electrical power produced by the solar panel.

In one embodiment of the invention, energy efficiency may be achieved by using a series of awake/sleep cycles for each communication node, wherein the total power consumption of a communication node does not exceed 10 mAh/hour, assuming there are at least four measurements and one communication per hour.

In another embodiment of the invention, energy efficiency may be achieved by using a series of awake/sleep cycles for each communication node, wherein the total power consumption of a communication node does not exceed 5 mAh/hour, assuming there are at least four measurements and one communication per hour.

In another embodiment of the invention, energy efficiency may be achieved by using a series of awake/sleep cycles for each communication node, wherein the total power consumption of a communication node does not exceed 3 mAh/hour, assuming there are at least four measurements and one communication per hour.

In another embodiment of the invention, energy efficiency may be achieved by using a series of awake/sleep cycles for each communication node, wherein the total power consumption of a communication node does not exceed 14 mAh/hour, assuming there are at least four measurements and one communication per hour.

In exemplary embodiments of the invention the wireless sensor networks are capable of operating continuously with battery power alone for a period of 7-15 days. Additional efficiency may be achieved and the duration of operations for WSNs may exceed months to a year or more with the use of battery and solar panel combinations.

In some embodiments of the invention, the total operating duty cycle of a communication node ranges between 0.006% to 1% of the duty cycle for conventional WiFi devices.

In another embodiments, the 802.16 complaint communications protocol is used in lieu of the 802.11 compliant communications protocol using the protocol phases of the systems and methods described herein.

Although the foregoing devices, systems and methods are described in reference to figures or embodiments in the specification, it will be appreciated there are many ways of the practicing the invention that will be within the grasp of one of ordinary skill in the art applying the teachings described herein. It should be noted that the devices and their subcomponents can be configured or designed in several different ways, for example, where all system modules are present in single microprocessor or divided amongst one or more microprocessors. It will also be appreciated that the methods, although described in a certain order, need not necessarily take place in the designated order unless so specified and/or the order is important to carrying out the specific function or purpose of the method.

BRIEF DESCRIPTION OF DRAWINGS

The present invention is illustrated by way of example, and not limitation, in the figures of the accompanying drawings, in which:

FIG. 2(a) illustrates the hardware architecture of a sink node, while

DETAILED DESCRIPTION OF THE INVENTION

Described herein is a wireless sensor network ("WSN") based on 802.11-compliant communication protocols and devices. In one embodiment, a WiFi-based WSN configured in accordance with the principles of the present invention includes modifications of conventional 802.11-compliant communication protocols to allow for long distance communication links and low average power consumption. The communication protocol provided in accordance with the invention uses synchronized wake up/sleep cycles, transmission energy control, and customized routing, synchronization and communication protocols. Individual network devices may be powered using batteries and/or solar panels.

The discussion below includes a description of a network architecture, outlining the interaction between individual nodes, and individual node architectures, describing the design of individual communication stations. As used herein, the term 802.11-compliant communication protocol means a wireless communication protocol compliant with wireless communication protocols of the IEEE 802.11 family of protocols, including but not limited to communication protocols specified by IEEE Std. 802.11-2007, 801.11a, 802.11b. 802.11g, 802.11-1997 (802.11 legacy), 802.11n, and the "WiFi" family of protocols. In addition, the following acronyms are used in connection with the description of the present invention:

WSN: Wireless Sensor Network
ESH: Equivalent Sunshine Hours
PSU: Power Supply Unit
PMU: Power Management Unit
ECSU: Embedded Computing and Storage Unit
CU: Communication Unit
SCU: Sensor Control Unit
OLSR: Optimal Link State Routing
OLSRD: Optimal Link State Routing Daemon
RND: Random Number
LOS: Line of Sight
AC: Access Point
ATIM: Ad hoc Traffic Indication Map
TIM: Traffic Indication Map
DTIM: Delivery Traffic Indication Map
DSR: Dynamic Source Routing
WDS: Wireless Distribution System
BVR: Beacon Vector Routing
CTP: Collection Tree Protocol
AODV: Ad hoc On-Demand Distance Vector
MPR: Multi Pint Relays
TC: Topology Control Before discussing details of the invention, it is helpful to recognize potential applications for WSNs configured in accordance with the invention. Several such applications are possible. For example, WSNs find particular application in areas which require frequent measurements of a physical property, usually an environmental or industrial value, or measurements which must be carried out densely in both time and space. Wiring together many sensors is difficult, expensive and, in many cases, simply not practical. Below are three examples.

In professional agriculture, in order to protect plants from various diseases, farmers uses different chemicals. Pesticides and fungicides are expensive. Moreover, the efficiency of their application methods are usually far from optimal. This is due to the fact that the exact knowledge of past weather parameters has to be known for precise application of the chemicals. Stand alone weather stations were developed to deal with these challenges. However, in the case of certain applications, such as viticulture, it is very hard to measure and model an entire vineyard's weather conditions owing to very hilly terrain. Consequently measurements from a stand-alone station often do not accurately represent weather at other parts of the vineyard.

This situation calls for several sensors distributed over the area of the vineyard, measuring the weather conditions more precisely. If measuring is in progress at several sites, data has to be gathered somehow. It can be done manually, by walking between the sensors, but such a solution is certainly limited by how often the fresh data is needed for disease prediction (in practice it is done daily), how big the field is and how many sensors are deployed. For hobbyist applications time is not critical but for industrial and professional applications (e.g., vineyards bigger than a few hectares) this is not a realistic solution.

Therefore, it is more convenient and comfortable to make the data downloadable from all of the sensors through a wireless communication channel upon request (it is considered impractical to wire the vineyard). Of course, how the individual sensors communicate is crucial. One option is to use GSM adapters at each station. While this is technically feasible, it is subject to communication fees payable to the GSM network operator. If measurements are taken every 15 minutes, at 30 stations, 24 hours a day, such fees can become excessive. Further, a GSM communication device is relatively complex and expensive.

WSN technology proposes a multi-hop communication network operating on an ISN license-free spectrum, providing very low operation and maintenance costs and also very large bandwidth. Basically, the WSN provides a mini communication network for gathering data for a specific need. Each communication node may be equipped with the necessary sensors and once the data is collected a decision prediction algorithm will be executed after or before the download.

Urban, air pollution or traffic monitoring is an another example where the application of WSN technology is beneficial. In order to monitor a district of city, distributed sensor measurements are necessary. In this case, WSN-equipped sensor nodes can be fixed to lampposts along the roads. Near line-of-sight conditions exist between the nodes and so relatively long communication ranges are achievable. In addition dedicated sensors, such as special cameras to measure traffic levels, can be attached to the communication nodes. With the combination of these two measurements, pollution levels can be predicted.

The term "general precision agriculture" includes several other areas where WSN systems are applicable. Generally, any location where micro-climate monitoring is important is a potential use case. These areas include, but are not limited to, nurseries, crop or orchard monitoring, frost detection, irrigation management, etc. Below are provided further examples where WSN systems can be employed.

Among the most important issues for WSN designs is battery life. It is expected that the deployed sensors should not require maintenance, and certainly should not require frequent batter replacement. Of course, this depends on the particular application. Generally, the less maintenance is necessary, the better for the application. Since the use of a WSN network is mostly motivated by that fact that many sensor nodes are necessary, maintenance must be considered in the context of the number of sensor stations. Consequently, long battery life and high level of autonomy is required for almost every application.

Because of these challenges, new communication initiatives, such, as ZigBee, are being developed. However, ZigBee technology is still not widespread and the standardization process has not been completed. At the same time, conventional 802.11-compliant communication protocol technologies do not provide an appropriate solution, in part because the energy consumption of a conventional 802.11-compliant communication protocol device, such as a router, is too great to be realistically supplied from batteries. In the case of a modest 802.11-compliant communication protocol communication device (example a home WiFi router), the average energy consumption is approximately 3 Watts. With a conventional 50 Ah automobile battery, the subject device would operate for only about a week (assuming the battery is not recharged) and, in any event, such a battery is very large, heavy and expensive, and is not practical for use in WSNs. For these and other reasons, conventional 802.11-compliant communication protocols (and the corresponding devices) have, to date, been deemed impractical for WSNs.

With the above in mind, we now turn to a discussion of WSNs configured in accordance with embodiments of the present invention.

Figure 1A:
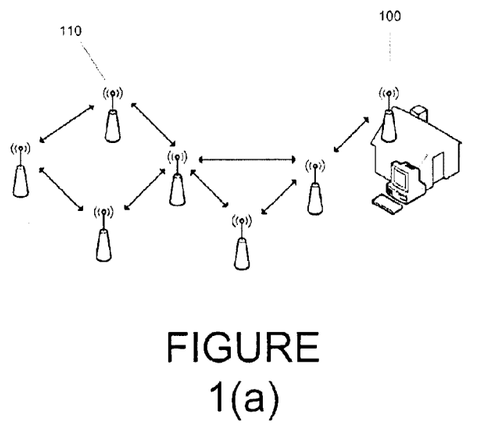
FIGS. 1(a) and 1(b) illustrate the two general network or communication layer architectures for WSN embodiments of the present invention.
Figure 1B:
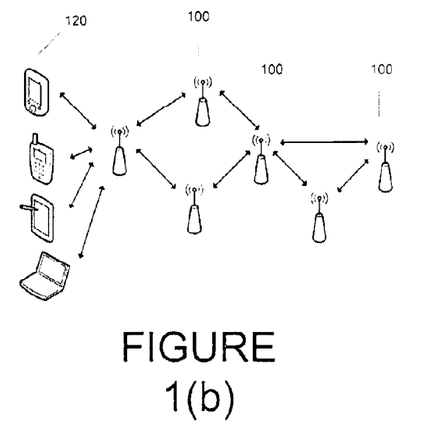

FIGS. 1(a) and 1(b) illustrate two general network or communication layer architectures for WSNs used certain embodiments of the invention. FIG. 1A illustrates a conventional WSN with a single sink node 100 and many measuring and relay nodes 110. In this case, the sink node 100 is the only point of the network where data storage (and/or data pre-processing) is actually done and this node is also used for data download. Usually the sink node 100 device is installed in a building and requires extra energy needs as compared to the other devices. Those other devices 110 are used firstly for measurements and secondly to form a multi hop wireless network to relay the gathered data to the sink node 100. Consequently, the hardware architecture of the nodes are different from the sink node.

FIG. 1B illustrates a second embodiment in which every node 100 of the WSN is a sink node and so it is possible to connect to any of them with the necessary equipment for data download, etc. In one embodiment of the present invention, 802.11-compliant communication protocol devices operating in an ad hoc mode are used, hence, such a configuration of WSN nodes makes it very easy to connect to the network with any 802.11-compliant communication protocol-enabled device 120 including, a laptop or other portable computing platform, a smart phone (i.e., a mobile computing device also having phone and/or wireless communication capabilities), a tablet style computing device (e.g., an iPad™), a personal digital assistant, etc. In practice, some of the application areas for this type of WSN architecture are quite beneficial. For example, multi-place data access can be very convenient in large vineyards so that a farmer can connect to the network at any node in the vineyard and check current and/or previous measurements.

Figure 2A:
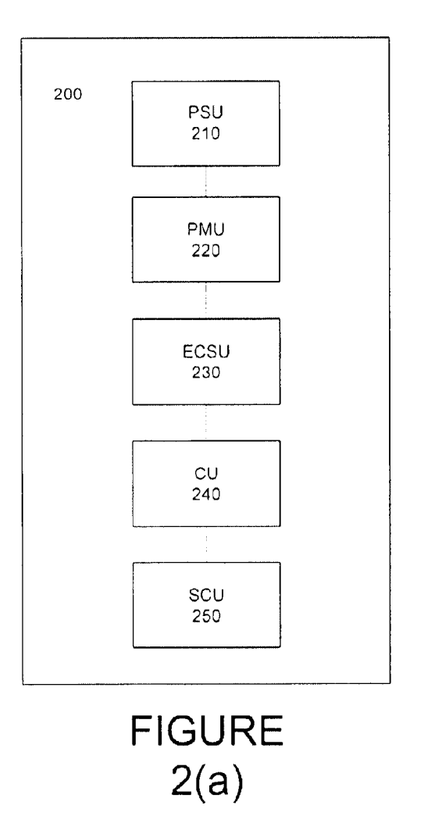
Figure 2B:
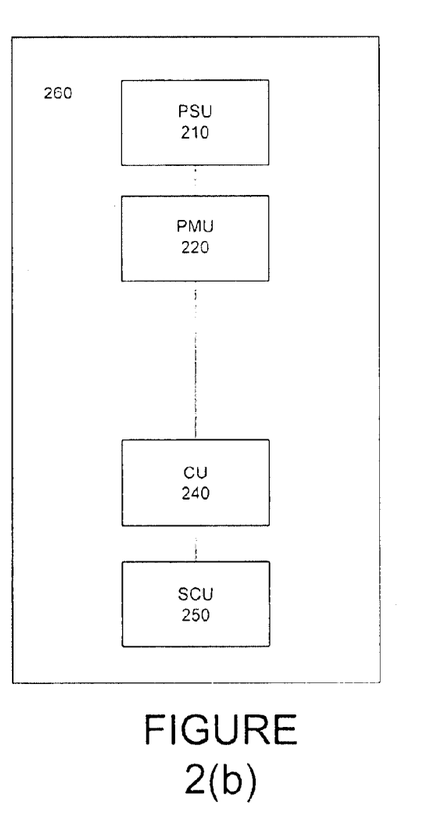
FIG. 2(b) shows the hardware architecture of a relay/measurement node, as used in embodiments of the invention.

FIG. 2A illustrates the hardware architecture of an embodiment of a sink node 200, while FIG. 2B shows the hardware architecture of an embodiment relay/measurement node 260. As depicted in FIG. 2A, the sink node 200 components include Power Supply Unit (PSU) 210, Power Management Unit (PMU) 220, Embedded Computing and Storage Unit (ECSU) 230, Communications Unit (CU) 240, and Sensor Control Unit (SCU) 250. As shown in FIG. 2B, the relay/measurement node 260 includes a PSU 210, a PMU 220, a CU 240 and a SCU 250.

This practice of node differentiation has developed for several reasons. Those WSN communication protocols which are generally used are not compatible with any generally used hand-held PC or smart phone communication protocols. Therefore an adapter has to be used and provided to the portable computing platform in order to provide communication with the WSN. Hence, it has generally proved easier to have only a sink node inside a building, where any necessary multi protocol routers can be attached to the system, making the data download and access easy. Further, such a design provides energy efficiency in favor of the relay nodes. It will also be appreciated that functions of the various systems PSU, PMU, ECSU, CU and SCU can be combined into fewer (in some cases a single) devices. For example, a programmed microprocessor could operate as the SCU and ESCU, with a separate radio for the CU. Other such combinations and variations are contemplated by embodiments of this invention.

Figure 3A:
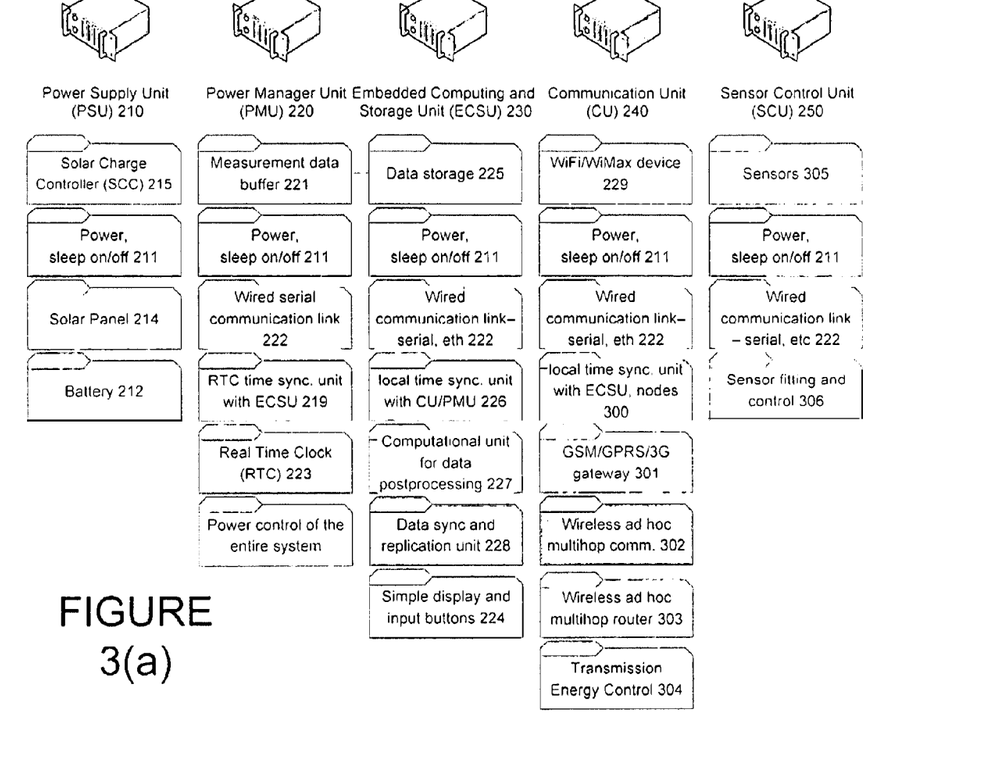
FIGS. 3(a) and 3(b) depict the architecture of a single WSN node and their subcomponents in accordance with an embodiment of the present invention
Figure 3B:
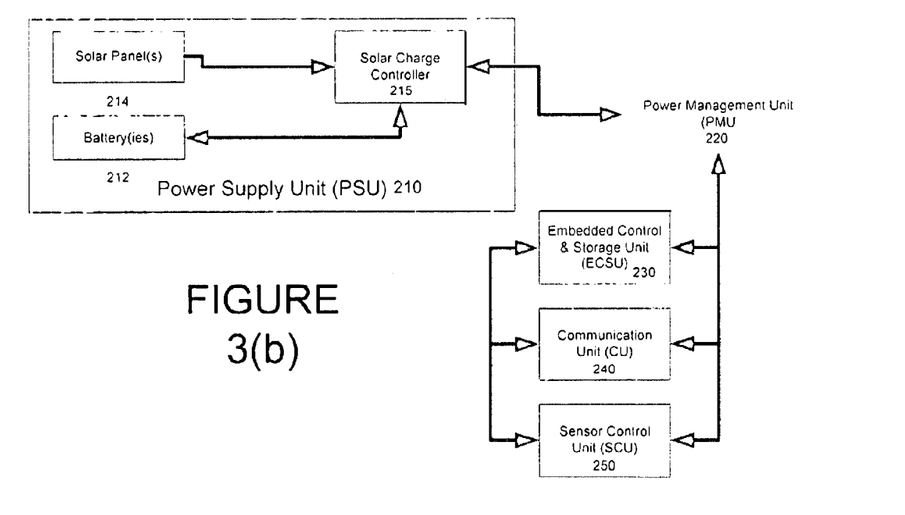

FIGS. 3A and 3B depict the architecture of a single WSN node in accordance with an embodiment of the present invention. As illustrated in FIG. 3(a) each node contains several subsystems: Power Supply Unit (PSU) 210, a Power Management Unit (PMU) 220 Embedded Computing and Storage Unit (ECSU) 230, Communication Unit (CU) 240, and Sensor Control Unit (SCU) 250.

The PSU 210 provides the necessary electrical power for the entire node. The power may be supplied from battery(ies) 212 and/or a solar pane) 214 (which may also be used to recharge the batteries)(shown in FIG. 3(b). The PSU also contains a Power-sleep on/off function 211, the function that controls which hardware unit is turned on or offer in sleep mode. This function is present in the other components 230-250 as shown in FIG. 3(a). The PSU also contains a Solar Charge Controller (SCC) 215 (depicted in FIG. 3(b)). In one embodiment, Batteries 212 and Solar Panel 214 (depicted in FIG. 3(b)) are connected to the Solar Charge Controller (SCC) 215, which delivers the power to PMU 220.

The PSU 210 is directly connected to the PMU 220, which provides power control and management for the rest of the system, regularly turning on/off or putting into sleep mode the CU 240 and ECSU 230. The functions of the PSU may be carried out in coordination with the other nodes with multilateral communication, clock synchronization, routing protocol synchronization, etc. This unit and the proposed communication protocols makes it possible to minimize the power consumption of the WiFi-based WSN to a level where it compares favorably with conventional WSN hardware implementations.

As shown in FIG. 3(a), the PMU 220 contains a measurement data buffer 221 which buffers data between communication phases and dispenses with the need to activate the ECSU for mass storage. The PMU also contains a Wired Serial Communication Link (WSCL) 222 (e.g., RS-232 or Ethernet) which may be used to reprogram the Real Time Clock (RTC) 223 according to user preferences. As shown in FIG. 3(a), the WSCL is also present in units 230-250. The RTC of the PMU keeps the time of the unit and wakes up the PMU microcontroller according to schedule, which in turn wakes up the other units 230-250 according to the wake/sleep cycle. The RTC time sync unit 219 of PMU 220 synchronizes the RTC time values with the other units.

The ECSU 230 as shown in FIG. (3)(a) manages data processing and storage and also controls the CU 240. The ECSU contains Simple Display and Input Buttons 224, as shown in FIG. (3)(a), which may include, e.g., visual indicators, such as light emitting diodes (LEDs) and switches that provide a straightforward user interface for monitoring the operation of the node. The ECSU contains a Data Storage Unit 225 which holds the data measurements collected from the SCUs in memory. The ECSU also contains a Local Time Sync Unit 226 which synchronizes time with the RTC of the PMU provides synchronized time values to the CU, and refreshes the time of its local RTC. The ECSU may also contain a Computational Unit for Data Processing 227, which, depending on the application, can handle data pre-processing or post-processing. In addition, the ECSU features a Data Sync and Replication Unit 228, which allows for data replication and synchronization across different communication nodes.

In one embodiment, the CU 240, as shown in FIG. 3(a), contains a WiFi or WiMax device 229 which utilizes the aforementioned 802.11-compliant or 802.16 communication protocol communication adapter which operates in ad hoc mode, handling the multi-hop communication with appropriate protocols. Hence, the other nodes become accessible and data exchange is possible. In addition, it also facilitates wireless data download for the user, which may be accomplished by installing an appropriate program for a laptop or other computing device making it part of the multi-hop network. The CU 240 also has a Local Time Sync 300 Unit which synchronizes time values with the ECSU and other CUs in order replicate or synchronize data across the other nodes. The CU may optionally include a GSM/GPRS/3G modem 301 to act as a gateway to mobile phone networks and the like. The CU also contains a Wireless ad hoc multihop communications module 302 and a Wireless ad hoc multihop router 303 to facilitate communications with other nodes. In addition, the CU contains a Transmission Energy Control protocol 304 which is utilized in power management.

Alternatively, the 802.11 or, in some embodiments, the 802.16 compliant communication protocol communication device may be operated in infrastructure mode, providing a conventional wireless download platform. For example, in one embodiment, consider the situation when a farmer arrives at this vineyard and the communication node is off or in sleep mode and the communication window is closed. An external water proof switch wakes up the communication node and also reconfigures the communication unit from ad-hoc mode to infrastructure ("on") mode. In this way a farmer, using a portable computing device can connect to communication node's WiFi (or WiMax) access point and download the data to his portable computing device. Once the download of data is complete, the device transmits a message, or alternatively the communication node itself is aware the download is complete, and instruction is given to the node to return to sleep mode or turn off (depending on its regular phase cycle). Consequently, every communication node is capable as serving as a WiFi or WiMax data access point.

As shown in FIG. 3(a), the SCU 250 consists of Sensors 305 and Sensor Fittings and Sensor Controls 306 appropriate to the intended application. This subsystem is directly connected to the PMU 220.

FIG. 3B depicts another embodiment of the WSU node system architecture. In this embodiment, PSU 210 includes one or both solar panels(s) 214 and/or batteries 212. The power source (batteries or solar panel) is connected to a Solar Charge Controller (SCC) 215, which in turn is connected to the PMU 220. As discussed above, the PMU is connected to the ECSU 230, CU 240 and SCU 250. The SCU communicates with the CU, which in turn communicates with the ECSU. The SCU may also communicate with the ECSU directly.

Having presented the overall system and node architectures, a discussion of the WiFi-based WSN communication protocol used in embodiments of the present invention is provided below. As noted above, conventional 802.11-compliant communication protocol devices consume significant amounts of energy because of the near 100% duty cycle. To provide reliable service, these nodes need to continuously monitor the communication channel to deliver access upon request. WSNs, on the other hand, generally do not require continuous data communications and so the communication interface can be activated only periodically, for example, once every 15 minutes or so, and sleep or otherwise go dormant at other times. Of course when a node wakes from sleep or off mode, a routing table has to be constructed (or a previous one reused) and because such activities may be performed at every site, a synchronized wake may be used to provide inter-node communication.

To provide the reader with an idea of the magnitude of the energy consumption involved, consider that a conventional 802.11-compliant communication protocol router used in a home network consumes about 200-300 mA/s at 12 Volts. It is possible to set up a mesh networking system based on such devices. Table 1 assumes this case, and provides, for several battery sizes, the relevant autonomy times (i.e., the length of time the device can operate entirely from the battery). It is easy to notice that such energy demands (200-300 mA/s, 12V=cca. 3 Watt) are impractical if they are to be provided by batteries. A conventional 3×AA battery pack can only supply energy for 3 hours. With a car battery, energy is available only for 8 days. Meanwhile the size and weight of any practical battery pack makes it almost impossible to provide for same in sensor network kinds of applications.

TABLE 1

Number of working hours for several different size of batteries, 802.11-compliant communication protocol based device running a multi-hop mesh networking protocol in conventional 802.11-compliant communication protocol ad hoc mode.

| Battery pack 12 V [Ah] | 0.81 3xHiMh AA (1.2 V, 2.7 Ah) | 2 | 3 | 4 | 7 | 50 car battery | 200 lorry battery |
|---|---|---|---|---|---|---|---|
| Number of working hours | 3.11 | 7.69 | 11.54 | 15.38 | 26.92 | 192.31 (8 days) | 769.23 (32 days) |

Figure 4A:
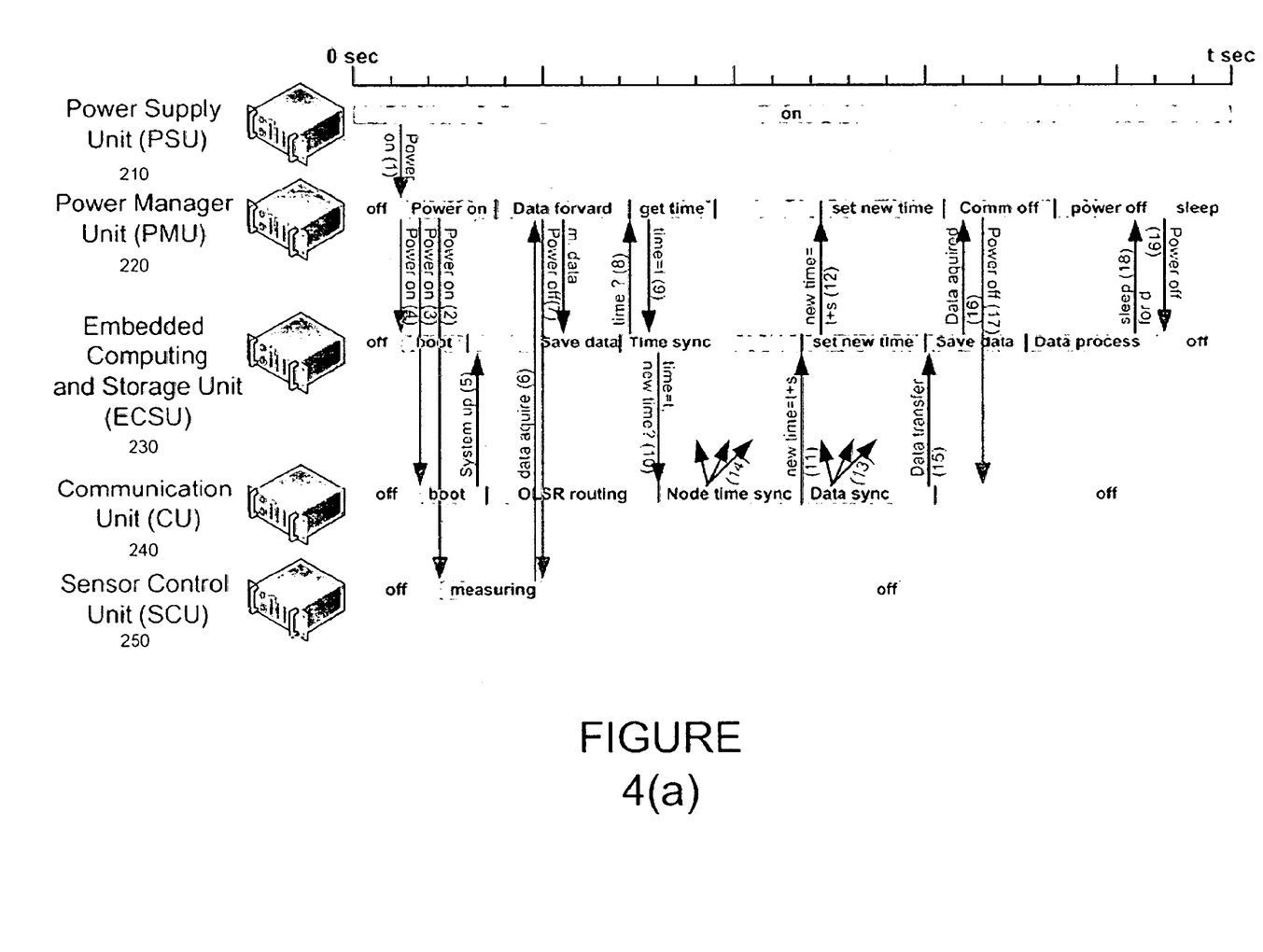
FIG. 4(a) illustrates the measuring and communication phases employed in one embodiment of the invention.

The proposed WiFi-based WSN protocol contains several phases, including measuring and communication phases, as illustrated in FIG. 4A. As shown, during the measuring and communication phase the PSU 210 is turned on (which also takes place at the time of initial deployment of the device), and the PSU in turn turns on the PMU 220. Once this microcontroller-based device wakes up, it turns on the rest of the system, including the ECSU 230, the CU 240 and the SCU 250. From this point, each unit acts in parallel. The SCU starts the measurement (e.g., using an attached sensor). Once the measurement is complete, the data is acquired and buffered by the PMU, after which the SCU is powered off by the PMU. As discussed earlier, the functions of these systems can be combined into fewer (in some cases single) devices.

The buffered measurement data is then transferred to the ECSU and saved (e.g., in memory, which may be instantiated in the form of a removable memory card). Thereafter, the CU is powered on and boots up and, when ready, indicates its ready state to the ECSU. This completes the measurement phase (which may involve several measurements, depending on the number of the attached sensors).

In order to share the measurement data with the other nodes, a communication phase is executed. This phase must be synchronized with the communication phases of the other nodes in the network since the point is to turn off the 802.11-compliant communication protocol device once it is done, in order to conserve energy. It is assumed that sometime prior to the initial device deployment, each RTC has been set precisely (this is discussed in greater detail below). Therefore, for the first communication phase after the device is turned on, the communication window should be relatively precise. But each subsequent communication phase time is preferably synchronized with the other nodes when synchronizing or forwarding the measurement data.

In one embodiment of the invention, time synchronization is carried out over the TCP/IP protocol using the NTP (network time protocol). Synchronization is initiated at the CU. The time is stored and kept running at the RTC module, which is embedded in the PMU. The time is requested from the ECSU and forwarded. Then, the local time value is passed to the CU. Once the time synchronization is done at the CU, a fresh time is sent to the ECSU and forwarded to the PMU. At each unit, the time is synchronized and finally refreshed into the RTC module.

After the time synchronization, data synchronization is executed. New data received from other nodes (if this is a sink node) is transferred to the ECSU and the completion of this transfer is indicated to the PMU. In response, the PMU powers off the CU. Once the data storage function is finished at the ECSU, the ECSU is also powered off by the PMU, which then enters a sleep mode in which only its RTC remains passively active. Hence almost the entire system, except for the PSU, is in sleep mode.

The PSU must be kept running since the battery charging and solar panel control operations are necessary. These operations can be minimized, but never turned off completely. Nevertheless, the system components which consume a significant amount of energy are either in a sleep mode or are turned off (e.g., depending on whether or not the actual hardware components have a sleep mode available). The less frequently the devices must be powered up to collect measurement data, the greater energy savings are possible. In some instances, the real time demands of the application may require more frequent power on cycles, and so the energy consumption will increase. The application will, for the most part, determine these parameters.

Figure 4B:
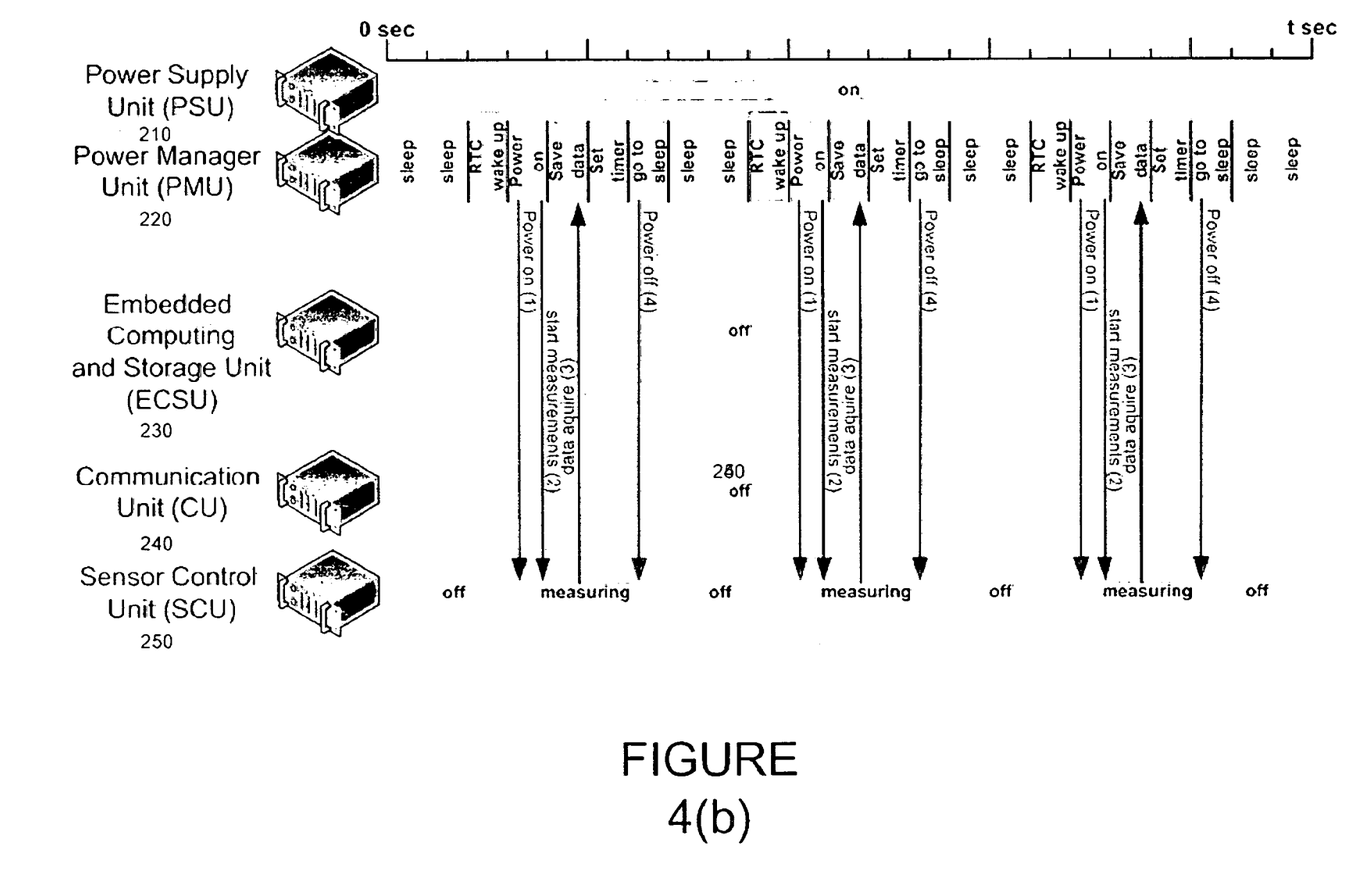
FIG. 4(b) illustrates an example of a measurement phase used in exemplary WSN protocols of an embodiment of the invention.

Referring now to FIG. 4B, which illustrates an example of a measurement phase, for general outside precision agricultural applications, measurements taken at approximately 15 minute intervals with hourly communication phases are deemed adequate. Thus, an example of such a deployment will have a communication phase (involving time and data synchronization), followed by four measurement phases, followed by another communication phase. Following each communication phase, the system will be in a sleep mode. At the designated times, the RTC will wake up the PMU 220, which, in turn, will activate the SCU 250 and initiate the measurement. Once the measurement is done and the data is acquired, the SCU is turned off by the PMU. The PMU then sets the RTC's timer for the next wake up and reverts to its steep mode. These measurement phases progress until the next communication cycle.

Figure 4C:
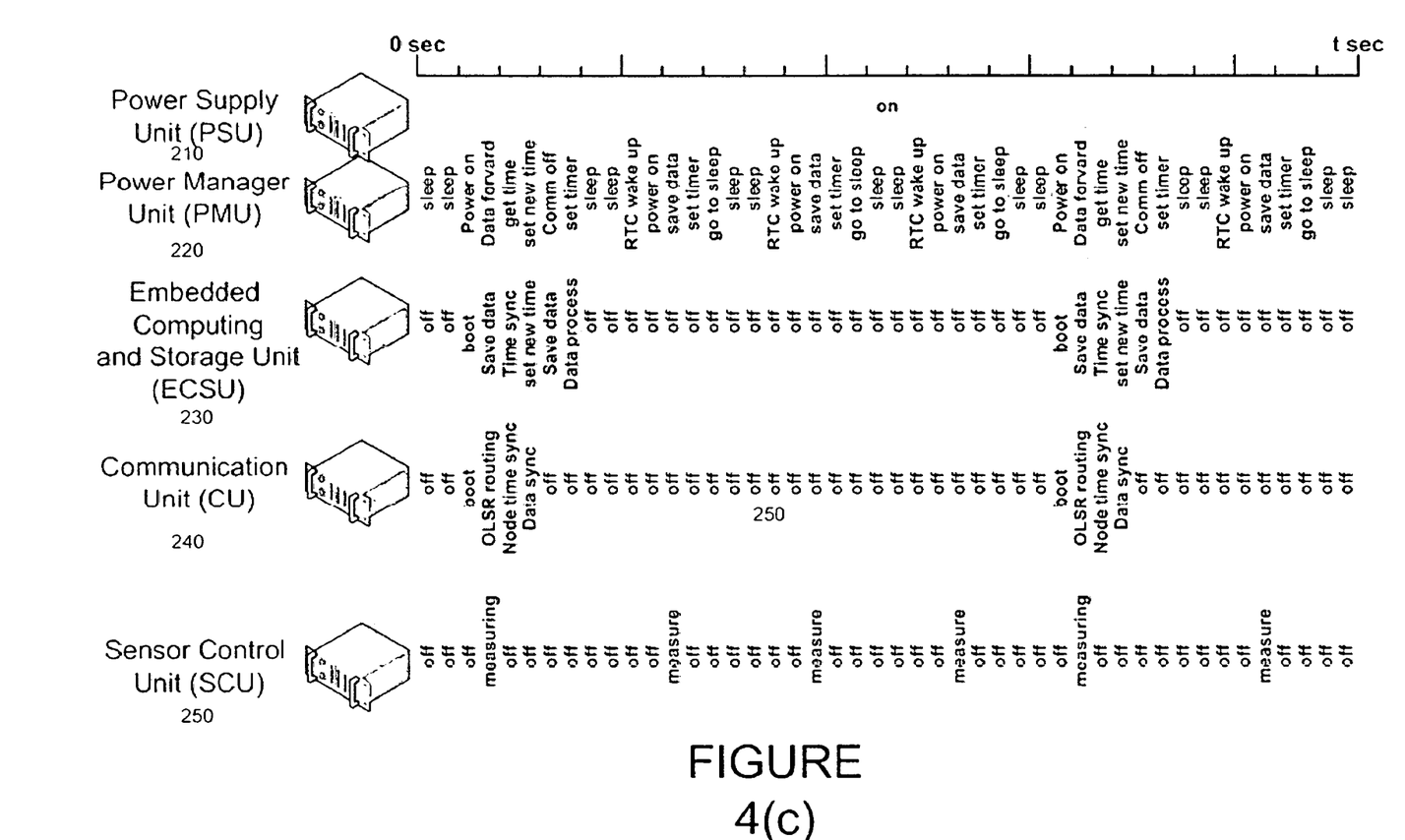
FIG. 4(c) gives an overview of the protocol phases and highlights the energy consumption by the various units at each operation.

FIG. 4C gives an overview of the protocol phases and highlights the operating states of various units at each stage. If a unit is on, its mode is also indicated.

For data replication storage, data synchronization is necessary. This can be performed using any of several existing utilities for TCP/IP networks, and the number of nodes which have data storage capabilities may depend on the particular application.

Time synchronization between nodes is needed to assure synchronized wake up phases. This is achieved using NTP, which can handle time synchronization over the TCP/IP layer. However one node should be designated as a master for time synchronization purposes. If it is a fixed node, and that fixed node becomes unavailable for some reason, time synchronization between the remaining nodes may be lost. This is not acceptable for an ad hoc network and so in one embodiment of the invention each node is configured to generate a random number (RN) and the RNs of all of the nodes are used as the basis for electing a master node for time synchronization purposes each time such synchronization is to occur (e.g., by electing the node in possession of the smallest RN). Of course, this requires an exchange of RNs between the nodes prior to the time synchronization. Once the master node (for time synchronization purposes) has been elected, the actual time synchronization may be performed using the time determined by the master node via NTP.

A set up mode is designed for WSN deployment. In this mode, the PMU keeps the CU running so that the visibility of the other nodes are continuous monitored. This helps to place the nodes in a more appropriate geographic location and orientation so that inter-node connectivity is guaranteed. If there is a node that is permanently set up, the remaining new nodes may start to synchronize time and data from it.

If a new node is deployed to the network its time has to be synchronized. In one instance, this is done by temporarily locating the new node adjacent or nearby another node and setting it into a set up mode. Meanwhile, the permanently placed node (if any) can be brought to an operational state (e.g., manually using a hardware switch). The node in set up mode will synchronize data from the other node.

There are a variety of possibilities for data download. For example, the data may be downloaded via a wired connection (e.g., an Ethernet or serial cable) into the ECSU. Data access is also possible by installing the OLSR routing protocol into a hand-held or other portable device which has a 802.11-compliant communication protocol interface (e.g., a laptop computer, PDA or smart phone). In this way the device becomes the part of the network itself. Alternatively, or in addition, one of the nodes may be switched to operate in infrastructure mode, allowing a laptop other computing device to connect as if the infrastructure node was a 802.11-compliant communication protocol hotspot.

In practice, the situation is somewhat more complex because the nodes are in sleep mode most of the time. When the user wishes to download data, it is likely that the devices will not respond since their communication modules are turned off. Hence, a hardware switch is provided to make a manually triggered wake up (e.g., via an external interrupt) possible. Whenever data download is required, the node of interest may be brought active using the hardware switch and if that node has any stored data it can be downloaded. After a predetermined period of time (e.g., one or more minutes), the node may revert to its sleep mode.

During experiments by the inventor, a 70 mW transmission power was used. This sufficed for data transmissions during the experiments, but of course the transmit power can and should be optimized for the application. Once the nodes have been deployed the optimal transmit power can be determined by slowly lowering the transmit power until inter-node communications are lost and then increasing the transmit power until satisfactory communications are restored. In some instances, a transmit power greater than that required for minimum acceptable communications may be warranted to guard against communication failures due to changes in the environment, etc.

The power supply unit contains three main components, a battery, a solar panel and a solar charge controller. The unit is intended to provide sufficient energy for the system under normal operating conditions. The WiFi-based WSN protocol minimizes energy consumption so that it becomes possible to meet this objective with reasonable battery and solar panel size. Table 2 summarizes energy consumption parameters for one example of a WiFi-based WSN node configured in accordance with an embodiment of the present invention. Each of the system modules are described in detail below.

TABLE 2

Hardware elements for system design and their energy consumption (at 12 Volts)

| WiFi-based WSN system modules | Hardware implementation | Consumption [mA/s] |
|---|---|---|
| Power Supply Unit (PSU) | Solar Charge Controller | 4 |
| Power Manager Unit (PMU) | Custom hardware | 45 (sleep: 1) |
| Embedded Comp. and St. U. (ECSU) | Embedded Linux board | 120 |
| Communication Unit (CU) | 802.11-compliant communication protocol device | 260 |
| Sensor Control Unit (SCU) | Custom hardware | 1 |

The data in Table 2 was used to create Table 3, which depicts the entire system's power consumption during the execution of the WiFi-based WSN protocol or, more precisely, the communication and measurement phase discussed above. The communication and measurement phase of the WiFi-based WSN protocol includes several sub-phases (boot up, OLSR, communication, turning off, measure and sleep). At each of these sub-phases the system's energy consumption is different since the number of operating units changes during every sub-phase. To calculate the entire energy need, each of these sub-phases has to be examined. In this way, the energy consumption of every hardware module is given at every sub-phase of the communication and measurement phase of the WiFi-based WSN protocol.

Boot Up: An exemplary implementation of the present invention used, for the most part, conventional 802.11-compliant communication protocol devices. Accordingly, most of these devices had a quite long boot op time since they were not designed for WSN purposes. Consequently, even though no protocol activity is carried out while these devices boot up, their energy need is considerable, as reflected in Table 3. The ECSU and the CU have considerable boot up times ("phase length" in Table 3). As shown, the ECSU consumed 120 mA/s, and the CU 260 mA/s, for 20 seconds. As it is also apparent from the above discussion of the WiFi-based WSN protocol, the PSU has to be turned on continuously. Consequently, it was decided to supply energy from a solar panel and so the PSU contains a solar charge controller, which is continuously turned on. It consumes 4 mA/s and is turned on during all of the protocol phases and sub-phases, including the boot up sub-phase. The PMU is in sleep mode while the system is waiting for the next wake up; but, whenever any part of the system is on (except the PSU) it is on as well. This is because the PMU controls the rest of the system and powers on/off the other devices as needed. The SCU has only a negligible boot up time, therefore its energy consumption is not listed under the boot up sub-phase.

OLSR: Optimal Link State Routing is an ad hoc routing protocol used by the CU and in this sub-phase the routing tables are constructed or updated. Of course, other ad hoc routing or sensor network protocols may be used in place of OLSR. During this sub-phase, the PSU, PMU and ECSU are also turned on. The ECSU could be turned on with a delay for additional energy savings.

Communication: The communication phase involves data transmission from node to node. All of the modules are turned on, except the SCU.

Turning Off: Turning off is a time consuming, but necessary, operation (as it also contains activities such as unmounting the memory, etc).

Measure: During this operation only the data measurement is necessary, without need for the communication equipment. Therefore the SCU and the PMU handle this operation. The SCU's power consumption is assumed to be 1 mA, and measurements are executed at every 15 minutes, thus 4×1 mA=4 mA consumption is listed in the table.

Sleep: As discussed above, the device remains in sleep mode between measurements and communications. The PMU is on hut is in sleep mode so it consumes far less energy that is the case during normal operation.

For the data provided in Table 3, it is assumed that there is one inter-node communication and four measurement phases per hour. The "phase length" provides the number of seconds during each such hour when the corresponding device is turned on. This allows the energy consumption per phases per hour to be calculated in mAh. This value is multiplied by 24 to arrive at a figure for the daily energy consumption of each phase. The complete energy consumption is also calculated as the sum the powder needs of all of the sub-phases (total energy consumption=9.5 mAh/hour, 228 mAh/day).

TABLE 3

Single node's power consumption per system phases using the WiFi-based WSN protocol.

|  | Boot up | OLSR | Comm. | Turning off | Measure | Sleep |
|---|---|---|---|---|---|---|
| Power Supply [mA/s] | 4 | 4 | 4 | 4 | 4 | 4 |
| Sensor Control [mA/s] | 0 | 0 | 0 | 0 | 1 | 0 |
| Communication [mA/s] | 260 | 260 | 260 | 260 | 0 | 0 |
| Embedded Comp. [mA/s] | 120 | 120 | 120 | 120 | 0 | 0 |
| Power Manager [mA/s] | 45 | 45 | 45 | 45 | 45 | 1 |
| Total [mA/s] | 429 | 429 | 429 | 429 | 50 | 5 |
| Phase length [s]/h | 20 | 15 | 2 | 1 | 4 | 3558 |
| [mAh]/hour | 2.3 | 1.7 | 0.2 | 0.1 | 0.05 | 4.9 |

TABLE 3-continued

Single node's power consumption per system phases using the WiFi-based WSN protocol.

|  | Boot up | OLSR | Comm. | Turning off | Measure | Sleep |
|---|---|---|---|---|---|---|
| [mAh]/day | 57.2 | 42.9 | 5.7 | 2.8 | 1.3 | 118.6 |
| Total [mAh]/hour | 9.5 | | | | | |
| Total [mAh]/day | 228.6 | | | | | |
| Total [mAh]/month | 6858 | | | | | |

With the WiFi-based WSN, the conventional 802.11-compliant communication protocol duty cycle of approximately 100% has been lowered to 1%. The 3.11 hour battery life mentioned above has been increased to 0.81/(0.0095-0.004)=180 hour (7.5 days) battery life for an implementation that relies on only conventional 802.11-compliant communication protocol components.

Table 4 lists the power consumption values by hardware components Every power consumption value is calculated at every phase per hardware module.

TABLE 4

Single node's power consumption per hardware units using the WiFi-based WSN protocol.

|  | Communication [mA] | Embedded Computing [mA] | Power Manager [mA] | Power Supply [mA] | Sensor Control Unit | Phase length [s] |
|---|---|---|---|---|---|---|
| Boot up sequence | 260 | 120 | 45 | 4 | 0 | 20 |
| OLSR routing | 260 | 120 | 45 | 4 | 0 | 15 |
| Communication | 260 | 120 | 45 | 4 | 0 | 2 |
| Power down sequence | 260 | 120 | 45 | 4 | 0 | 1 |
| Measurements | 0 | 0 | 45 | 4 | 1 | 4 |
| Deep sleep | 0 | 0 | 1 | 4 | 0 | 3558 |
| [mAh] per hour | 1.444 | 0.667 | 0.250 | 0.022 | 0 | |
|  | 1.083 | 0.500 | 0.188 | 0.017 | 0 | |
|  | 0.144 | 0.067 | 0.025 | 0.002 | 0 | |
|  | 0.072 | 0.033 | 0.013 | 0.001 | 0 | |
|  | 0 | 0 | 0.050 | 0.004 | 0.001 | |
|  | 0 | 0 | 0.988 | 3.953 | 0 | |
| Total [mAh]/hour | 2.74 | 1.27 | 1.513 | 4 | 0.001 | 9.5 |
| Total [mAh]/day | 65.87 | 30.4 | 26.320 | 96 | 0.027 | 228.6 |
| Total [mAh]/month | 1976 | 912 | 1089 | 2880 | 0.800 | 6858.4 |

It will be appreciated that this implementation is based on conventional 802.11-compliant communication protocol components, and so additional energy savings may be possible by improving the boot up phase of such devices as well as the power consumption of the PSU when the device is in sleep mode. For example, the PSU used for these tests employed a solar charge controller capable of handling 5.5 A/s, when all that was truly needed was 330 mA/s. Another area for possible energy savings is during the OLSR subphase. The actual communication only takes a brief amount of time, so improvements to reduce the length of time needed for building the routing tables would provide substantial energy savings. This is demonstrated below. Nevertheless even with the use of these conventional 802.11-compliant communication protocol components, substantial energy savings were achieved and such a system could be deployed for industrial and precision agriculture purposes. As described further below, it is possible to supply the energy needs of the device from the solar panel, hence long term operations (on the order of years) is possible.

Tables 5 and 6 below provide estimates for an improved WiFi-based WSN with realistic assumptions to advise the reader as to achievable energy consumption values in accordance with embodiments of the present invention. In these examples, a solar charge controller which consumes 1 mA, with a maximum 1 A throughput current, is proposed. Further a last boot up, on the order of approximately 2 seconds, is deemed achievable with appropriate hardware. Fast turn-off and communication times are also envisioned. These modifications decrease the total energy consumption from 9.5 mAh/hour to 2.99 mAh/hour. This configuration yields approximately 0.81/(0.00299-0.00.1)=407 hour (16 days) of operation without recharging. It should also be noted that much lower energy consumption values are achievable with optimized hardware, e.g., 0.14 mAh/hour, and the achievable minimal values are very close to ZigBee's. Given these circumstances the previously shown values with the hardware components can be further optimized.

TABLE 5

Improved single node's power consumption per system phases using the WiFi-based WSN protocol.

|  | Boot up | OLSR | Comm. | Turning off | Measure | Sleep |
|---|---|---|---|---|---|---|
| Power Supply [mA/s] | 1 | 1 | 1 | 1 | 1 | 1 |
| Sensor Control [mA/s] | 0 | 0 | 0 | 0 | 1 | 0 |

TABLE 5-continued

Improved single node's power consumption per system phases using the WiFi-based WSN protocol.

|  | Boot up | OLSR | Comm. | Turning off | Measure | Sleep |
|---|---|---|---|---|---|---|
| Communication [mA/s] | 260 | 260 | 260 | 260 | 0 | 0 |
| Embedded Comp. [mA/s] | 120 | 120 | 120 | 120 | 0 | 0 |
| Power Manager [mA/s] | 45 | 45 | 45 | 45 | 45 | 1 |
| Total [mA/s] | 426 | 426 | 426 | 426 | 47 | 2 |
| Phase length [s]/h | 2 | 4 | 1 | 1 | 4 | 3588 |
| [mAh]/hour | 0.236 | 0.473 | 0.118 | 0.118 | 0.052 | 1.993 |
| [mAh]/day | 5.680 | 11.36 | 2.840 | 2.840 | 1.253 | 47.84 |
| Total [mAh]/hour | 2.99 | | | | | |
| Total [mAh]/day | 71.81 | | | | | |
| Total [mAh]/month | 2154 | | | | | |

TABLE 6

Improved single node's power consumption per hardware units using the WiFi-based WSN protocol.

|  | Communication [mA] | Embedded Computing [mA] | Power Manager [mA] | Power Supply [mA] | Sensor Control [mA] | Phase length [s] |
|---|---|---|---|---|---|---|
| Boot up sequence | 260 | 120 | 45 | 1 | 0 | 2 |
| OLSR routing | 260 | 120 | 45 | 1 | 0 | 4 |
| Communication | 260 | 120 | 45 | 1 | 0 | 1 |
| Power down seq. | 260 | 120 | 45 | 1 | 0 | 1 |
| Measurements | 0 | 0 | 45 | 1 | 1 | 4 |
| Deep sleep | 0 | 0 | 1 | 1 | 0 | 3588 |
| [mAh] per hour | 0.144 | 0.067 | 0.025 | 0.001 | 0 | |
|  | 0.289 | 0.133 | 0.050 | 0.001 | 0 | |
|  | 0.072 | 0.033 | 0.013 | 0.000 | 0 | |
|  | 0.072 | 0.033 | 0.013 | 0.000 | 0 | |
|  | 0 | 0 | 0.050 | 0.001 | 0.001 | |
|  | 0 | 0 | 0.997 | 0.997 | 0 | |
| Total [mAh]/hour | 0.578 | 0.267 | 1.147 | 1.000 | 0.001 | 2.992 |
| Total [mAh]/day | 13.867 | 6.400 | 27.520 | 24.000 | 0.027 | 71.81 |
| Total [mAh]/month | 416 | 192 | 825.600 | 720 | 0.800 | 2154.4 |

The solar charge controller (SCC) 215, as shown in FIG. 3B, is connected to the battery, to the solar panel and to the load, which is in this case the rest of the system. It is directly connected to the PMU, since that component controls the energy supply to the rest of the system. The SCC charges the battery with the energy provided by the solar panel. If the energy generated by the solar panel is insufficient for operation of the system, the necessary additional energy is provided by the battery. In addition the charge controller protects the battery from being overcharged by the solar array and from being deeply discharged by the loads. The charging takes place through multiple stages which include automatic adaptation to the ambient temperature for optimal charging of the battery. Collectively, the SCC, the battery and solar panel make up the PSU.

Table 7 reports solar panel and battery sizes for world-wide usage. Two daily power consumption values were calculated, 228 and 72 mAh/day. The PSU is responsible for continuously providing this amount of energy with the help of the solar panel and battery. In some embodiments of the invention, the system requires 20 days of autonomous operation from the battery without the help of the solar panel. Further, it is not advisable to allow situations where the battery completely discharges (i.e., to 0% capacity or nearly so), as that tends to foreshorten the life of the battery and can also limit its full charge capacity. The charge capacity also decreases with temperature, which is an important design consideration if the system is to be used outdoors year round. The effects of self-discharge must also be accounted for inasmuch as charging efficiency may vary according to the level of self-discharge. In general, battery capacity is a function of discharge rate.

As a result of the above considerations, the minimum discharge state of the battery should remain, above 30% (or more, e.g., above 40%, if Winter operation is contemplated). Consequently, a system requiring 228 mAh/day would require a battery, and a system requiring 72 mAh/day requires a battery.

TABLE 7

Battery and solar panel sizing for world-wide usage.

| Battery sizing | | |
|---|---|---|
| Power consumption per day: [mAh] | 228 | 72 |
| System autonomy [days] | 20 | 20 |
| Energy required for 20 days:[mAh] | 4560 | 1440 |
| Battery over discharge protection | +30% | +30% |
| Battery winter discharge protection | +10% | +10% |
| Required battery size: [mAh] | 6520 | 2059 |

TABLE 7-continued

Battery and solar panel sizing for world-wide usage.

| Required battery size: [mWh] | 78249 | 24710 |
|---|---|---|
| Solar module sizing - general case | | |
| Equivalent sunshine hours (ESH) | 2 | 2 |
| Safety factor | +20% | +20% |
| System mAmps (to be provided by the module) | 136.8 | 43 |
| System mWatts (to be provided by the module) | 1641 | 518 |
| Solar module sizing - worst case | | |
| Equivalent sunshine hours (ESH) | 0.5 | 0.5 |
| Safety factor | +20% | +20% |
| System mAmps (to be provided by the module) | 547 | 172 |
| System mWatts (to be provided by the module) | 6566 | 2073 |

Sealed lead acid batteries are commonly used in solar-powered systems and are favored because of their relatively low price per given capacity. Rapid charging, however, is not possible, but nor is it strictly necessary in a WSN or available when using solar panels for charging. Of course, such batteries are quite heavy per given capacity, which makes them difficult to use in mobile nodes. Fortunately, this is not a strict requirement of all WSNs. Of course, if the energy consumption of the WiFi or WiMax based WSN components were minimized through the use of optimal hardware, the energy consumption, would be significantly reduced and smaller, perhaps lighter, batteries could be employed. It will be appreciated that any type of suitable battery can be used with the present invention, including, e.g., lead-acid, alkaline long-life. Carbon-zinc, Nickel Metal Hydride (NiMH), Nickel Cadmium (NiCad) and Lithium.

The requisite size of the solar panel will depend on the equivalent sunshine hours (ESH) to which the panel is exposed, which, in turn, depends on the geographical position of the deployed system. The ESH for a given system can be determined from various available tables and/or an insolation availability map of the deployment area. For a general case, the ESH should be 2 and for worst case scenario 0.5 should be used. If a 20% safety factor is used, then needs to be provided, on average, by the solar module. This is equal to a 1.6 Watt module.

Figure 5:
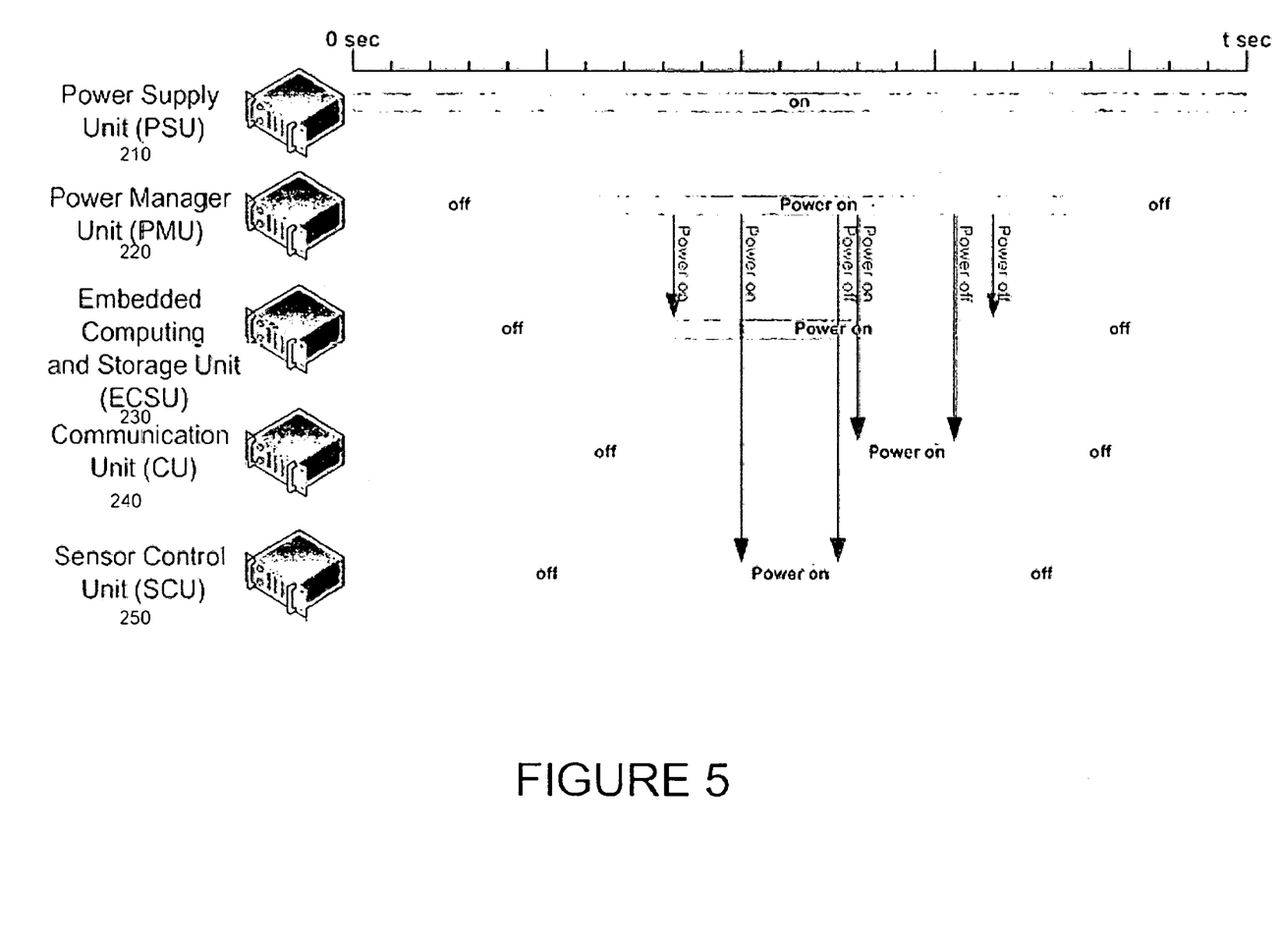
FIG. 5 depicts one embodiment of how the PMU controls power to the other components of the node in accordance with the proposed WiFi-based WSN communication protocol.

The design of the PMU is an important consideration, for the overall node. Because the WSNs usually rely on batteries for long system autonomy, low power consumption is required. This is realistically achievable only in those instances where the 802.11-compliant communication protocol devices are powered down in some fashion for a period of time. As indicated above, the PMU contains an RTC and a micro-controller to provide these necessary functions. FIG. 5 illustrates one embodiment of how the PMU 220 controls power to the other components of the node, including the ECSU 230, CU 240 and SCU 250 in accordance with the proposed WiFi-based WSN communication protocol. The operation of the PMU in this fashion ensures that energy consumption is minimized, however, as discussed above, communication synchronization becomes necessary. In addition, the PMU provides other functions, as discussed below.

Measurement Data Buffer: The PMU is a convenient location to buffer measurement data between communication phases as this unit remains turned on or operates in a sleep mode. Buffering data here relieves the need to turn on the ECSU in order to access a mass storage unit.

Power, Sleep On/Off: As shown in FIG. 5, the PMU controls which hardware unit is turned on or off. If one or more of those units support a sleep mode, the PMU may take advantage of that sleep mode as an alternative to completely powering off the unit.

Real Time Clock (RTC): As explained above, the PMU contains an RTC unit. Time is kept in a HH:MM:SS, DD:MM:YYYY (hour, minute, second, day, month, year) format or in more precise format. Switches which turn on/off the loads are controlled by a micro-controller embedded in the PMU. A wake up schedule is given to the micro-controller by the ECSU. This wake op schedule defines which node to turn on, and when to turn it off, as it is indicated in FIG. 5. The program is repeated according to a schedule of how often measurements and communication phases are necessary (measurements may typically occur every 15 minutes, with communications being once per hour). The RTC remains on continuously and wakes up the micro-controller according to the schedule. The micro-controller then wakes up the other necessary subsystem(s) for the scheduled task (e.g., measurement or communication, etc.). It is also possible to wake up the system through an external interrupt (triggered by toggling a hard wired switch, for example) to assure the ability to download data any time the user requires it.

Wired Serial Communication, Link: In one embodiment of the invention, the RTC is readable and writeable, for example to access its wake up schedule, through a serial port (e.g., an RS-232 interface). Hence, if any modifications are necessary when the whole system is up, the ECSU can reprogram the RTC according to user preferences.

RTC Time Synchronization: The RTC value is synchronized with other nodes of the system when necessary. As indicated above, this may occur at the outset of every communication phase (or select ones thereof), since time has to be provided to the CU and ECSU.

The ECSU is a data processor and data storage device, and executes part of the WiFi-based WSN protocol, including time synchronization and programming the RTC in the PMU based on an Atmel NGW100 demo board was used (AT32AP7000 processor. Features of the ECSU include the following:

Data Storage: Table 8 illustrates an example of the kinds of information that the ECSU may need to store. In this example, an agricultural application is envisioned. The table shows that approximately 1 MByte data is acquired (and, hence, must be stored by the ECSU) during a year's worth of measurements. If, in addition to the current year's data, several year's worth of backup data is necessary, the ECSU's storage capacity must be sized accordingly. In order to guard against inadvertent data loss, it make sense to mirror the stored data between the nodes of the WSN. This further increases the ECSU data storage capacity requirement. In one embodiment, ECSU's having 512 MBytes storage capacity are required. This is a relatively simple requirement to satisfy with modern flash-based memory cards and the like.

Power, Sleep On/Off: For energy consumption, a sleep mode (preferable) or a power off mode is utilized.

Wired Communication Link, Serial, Ethernet: Communication with the other units of a node may be provided over RS-232 serial link and/or Ethernet.

Local Time Synchronization Unit with CU/PMU: The ECSU device is repeatedly turned off (or placed in asleep mode) in accordance with the WiFi-based WSN protocol, hence its time has to be synchronized with the local RTC (embedded in the PMU) when it is powered up or awakened. Also, this time has to be provided to the CU so that it can synchronize with the other nodes. Once the synchronized data has arrived, it is up to the ECSU to set the fresh time in the local RTC.

Computation Unit for Data Post Processing: Depending on the application, data pre-processing or even post-processing, may be utilized. The required computation unit of the ECSU will therefore be application dependent.

Data Synchronization and Replication: For data safety, it may be necessary to keep a replicated copy of the measurement data at several nodes. In addition, the node may be required to manage data downloads to a portable computing device via wired or wireless means.

Simple Display and Input Buttons: Basic operational state information (such as power on/off, sleep mode, set up mode, etc.) should be displayable (e.g., using LEDs or other display devices) by the node itself. In addition, hard wired switches (for waking the unit, etc.) should be provided, as discussed above.

TABLE 8

Sample data storage requirements for viticulture

|  | [Byte] | [Mbyte] |
|---|---|---|
| Date | 4 | |
| Time | 6 | |
| Station ID | 2 | |
| Sensor 1: Temperature | 2 | |
| Sensor 2: Humidity | 2 | |
| Sensor 3: Light intensity, solar radiation | 2 | |
| Sensor 4: Leaf wetness | 2 | |
| Sensor 5: Wind speed | 2 | |
| Sensor 6: Wind direction | 2 | |
| Sensor 7: Soil moisture | 2 | |
| Sensor 8: Soil temperature | 2 | |
| Sensor 9: Precipitation | 2 | |
| Sensor 10: Soil pressure | 2 | |
| Total per measurements | 32 | |
| 4 measurements per hour | 128 | |
| 96 measurements per day (24 × 4) | 3072 | |
| Storage space required for one month | 92160 | |
| Storage space required for one year | 1105920 | 1.05 |
| Storage space required for 5 years | 5529600 | 5.27 MB |
| Storage space required for 100 stations, 5 years | 552960000 | 527.34 MB |

The CU may be a conventional 802.11-compliant communication protocol router (operable in ad hoc mode in a multi hop network using an ad hoc routing protocol such as OLSR) or a customized device optimized for operation according to the WiFi-based WSN protocol. Preferably, the CU has an available sleep mode (for improved energy conservation) and at a minimum can be powered on and off according to the WiFi-based WSN protocol. Communications with the CU (from the other modules in a node) may be through wired (e.g., Ethernet or RS-232) communication link, or, in some instances, through a wireless link. Local time synchronization with the ECSU, for example, may be facilitated over Ethernet or a serial communication link. The CU may optionally include a GSM/GPRS/3G modem to act as a gateway to mobile phone networks and the like. This is useful when communications must be delivered to a location outside the WSN range. To further optimize energy consumption, it is useful if the CU allows control of its transmission power.

The SCU is responsible for controlling the attached sensors, the type and nature of which will vary depending upon the application. Agricultural sensors may include: temperature, humidity, light intensity, solar radiation, leaf wetness, wind speed, wind direction, soil moisture, soil temperature, precipitation, and soil pressure sensors. As with the other modules, since continuous measurements are generally not necessary, the SCU should have a power off or sleep mode and provision for a wired communication link (e.g., a serial communication link) to the PMU and/or the ECSU for mode control and data transfer. Since it is likely that the sensors will be used outdoors, appropriate packaging for the SCU (and the other components of the node) is required. In one embodiment of the invention, at least IP65 protection is required.

As discussed above, an ad-hoc routing protocol is needed to allow for routing tables to be constructed quickly during times when the CUs of the various WiFi-based WSN nodes are powered up. In one embodiment of the invention, Optimal Link State Routing (OLSR) is used, however, any of several other rooting protocols could be used. For example, any of the Ad hoc On-Demand Distance Vector, Dynamic Source Routing, or Wireless Distribution System (WDS) protocols could be employed. OLSR is a proactive routing protocol. It is a link state as it periodically floods the entire network with control messages. To minimize this overhead, only selected nodes are used for message flooding. Only multi point relays (MPR) retransmit control messages. Nodes select MPRs such that there exists a path to each of its 2-hop neighbors via a node selected as an MPR.

OLSR has two basic type of messages: Hello and TC (Topology Control) messages. Hello message broadcast is for the neighbors (in terms of radio range connectivity) of the sender. These messages are not forwarded by the receivers. The messages are used to help detect a node's 1-hop neighbors. Hello messages contain a list of the sender's neighbors, which will be learned by the receiving node, and also the sender's identification (ID). Consequently, all 2-hop neighbors can be listed. In addition, Hello messages can indicate whether the sender or receiver is an MPR node.

TC messages are global messages, forwarded by MPR nodes. As a result, the learned local topology messages are passed on to the other nodes using massage flooding (only MPR nodes send and retransmit TC messages). Accordingly, these messages carry this information to every part of the network and local routing tables are constructed from the information contained in these messages. The resulting routing tables are used to send data to any destination of the network.

In one embodiment of the invention, routing tables are not reused. Instead, the routing tables are rebuilt after every sleep cycle or power off of the CU. To speed up this process, and thereby shorten the powered on window of the device and conserve energy, certain adjustments of the conventional OLSR protocol (in particular Hello interval and TC interval) were made. The frequency at which these messages are transmitted strongly influences the time necessary to build complete routing tables for the whole network topology. Table 9 shows the settings used in connection with an embodiment of the present invention and the resulting times needed to execute the routing table phase and the entire WiFi-based WSN protocol.

TABLE 9

OLSR parameter optimization for accelerating routing table building and decreasing entire communication window size

|  | setting 1 | setting 2 | setting 3 | setting 4 |
|---|---|---|---|---|
| Host Net Announce | hostnet | hostnet | hostnet | hostnet |
| Poll Rate | 0.1 | 0.1 | 0.1 | 0.1 |
| TC Redundancy | 2 | 2 | 2 | 2 |
| MPR Coverage | 7 | 7 | 7 | 7 |
| Link Quality Fish Eye | Enable | Enable | Enable | Enable |
| Link Quality Dijkstra Min | 0 | 0 | 0 | 0 |
| Link Quality Dijkstra Max | 5.0 | 5.0 | 5.0 | 5.0 |
| Link Quality Level | 2 | 2 | 2 | 2 |
| Hysteresis | Disable | Disable | Disable | Disable |

TABLE 9-continued

OLSR parameter optimization for accelerating routing table building and decreasing entire communication window size

|  | setting 1 | setting 2 | setting 3 | setting 4 |
|---|---|---|---|---|
| Hello Interval | 5.0 s | 0.5 s | 0.25 s | 0.125 s |
| Hello Validity Time | 90.0 s | 1.5 s | 0.75 s | 0.375 s |
| TC Interval | 2 s | 0.5 s | 0.25 s | 0.125 s |
| TC Validity Time | 270.0 s | 3.75 s | 1.875 s | 0.9375 s |
| MID Interval | 15 s | 1.5 s | 0.75 s | 0.375 s |
| MID Validity Time | 90.0 s | 3.75 s | 1.875 s | 0.9375 s |
| HNA Interval | 15.0 s | 1.5 s | 0.75 s | 0.375 s |
| HNA Validity Time | 90.0 s | 3.75 s | 1.875 s | 0.9375 s |
| Communication interface boot up time | 20 s | 20 s | 20 s | 20 s |
| OLSR routing table building time | 25 s | 15 s | 9 s | 8 s |
| Data communication | 2 s | 2 s | 2 s | 2 s |
| Total time needed for data delivery | 47 s | 37 s | 31 s | 30 s |

Thus, a WiFi-based WSN protocol and nodes for use therewith have been described. It will be appreciated that the aforementioned embodiments of the invention described using an 802.11 compliant communications protocol may similarly utilize an 802.16 compliant communications protocol in ad-hoc mode that yields similar duty cycles and energy consumption values as described herein. One of ordinary skill in the art deploying WiMax enabled communication devices, using the teachings described herein, may implement a similar communication node including a power supply unit, a power management unit, embedded computing and storage unit, communications unit, and sensor control unit, and further operate such a unit using the protocol methods described herein. As previously discussed, these units may be distributed across one or more microprocessors.

MODE(S) FOR CARRYING OUT THE INVENTION

It will be appreciated that there are different modes for carrying out the present invention.

In one embodiment, the 802.11-compliant communication protocol standard is used. The protocol can be operated on any 802.11 compliant communication unit. The protocol provides long distance communication links with low average power consumption. In order to maximize the energy efficiency of each node in the WSN, the protocol uses synchronized wake up/sleep/off cycles, transmission energy control, and customized routing, synchronization and communication protocols. These systems and the proposed communication protocols makes it possible to minimize the power consumption of the WiFi-based WSN to a level where it compares favorably with conventional WSN hardware implementations.

In one exemplary embodiment, as depicted in FIG. 1A, an ad-hoc system is utilized. In this system, every node of the WSN is a sink node. Thus each node includes a PSU, PMU, ECSU, CU and SCU, making it is possible to connect to any of them with the necessary equipment for data download, etc. In such a system, 802.11-compliant communication protocol devices operating in an ad hoc mode may used, making if very easy to connect to the network with any 802.11-compliant communication protocol-enabled device including, a laptop or other portable computing platform, a smart phone, an iPad, a personal digital assistant, etc. In practice, in some of the application areas for this type of WSN architecture are quite beneficial. For example, multi-place data access can be very convenient in large vineyards so that a farmer can connect to the network at any node in the vineyard and check current and/or previous measurements.

In another embodiment, an infrastructure mode as depicted in FIG. 1B is used. This mode uses a conventional WSN with a single sink node and many measuring and relay nodes. In this case, the sink node is the only point of the network where data storage (and/or data pre-processing) is actually done and this node is also used for data download. Thus, in this embodiment, the single sink node includes the PSU, PMU, ECSU, CU and SCU. The relay or measuring nodes, include the PSU, PMU, CU and SCU. Usually the sink node device is installed in a building and requires extra energy needs as compared to the other devices. Those other devices are used firstly for measurements and secondly to form a multi-hop wireless network to relay the gathered data to the sink node. Consequently, the hardware architecture of the nodes are different from the sink node.

It will also be appreciated that there are different modes for powering the WSN. In one embodiment, the PSU, depicted in FIG. 3B is powered by a solar panel. In another embodiment, the PSU can be powered by battery. In yet another embodiment, the PSU is powered by a hybrid of battery and solar power.

In will be appreciated that in other modes, an 802.16 compliant communications protocol may be utilized in a WSN using the teachings described above.

INDUSTRIAL APPLICABILITY

There are several industrial and practical applications of the WSN systems described above. For purposes of this section, however, two specific examples are discussed. It should be noted that the following examples are only illustrative and numerous industrial and practical uses (some of which are listed above) are contemplated by embodiments of the present invention.

One industrial application concerns monitoring in professional agriculture. Farming and crop maintenance need to account for several factors, such as weather, water levels, sunshine, humidity, pest control, etc. For example, in order to protect plants from various diseases farmers use different chemicals. Pesticides and fungicides are very expensive if a unit price is calculated for an entire year and for an entire yard. Moreover the efficiency of these methods is usually far from optimal. This is due to the fact that the exact knowledge of past weather parameters has to be known for precise application of the chemicals. Stand alone weather stations were developed to cope with these challenges. However in case of certain applications such as viticulture it is very hard to measure and model the vineyard's weather conditions. Since, vineyards are very hilly, consequently what a stand alone station can measure does not represent other parts of the vineyard. This calls for several sensors distributed over the area, measuring the weather conditions more precisely.

However, monitoring conventional sensors manually is laborious and time consuming. Using existing WiFi technology protocols is also very power consuming, when remote sensors must be battery or solar powered due to lack of "plug in" power supplies connected to the electricity grid. According to the present invention, a WSN network can be setup to collect data from several locations in a crop field or vineyard over long periods of time using battery and solar powered WSN nodes that communicate using 802.11-compliant communications protocol according to the present invention. This system will allow farmers to collect accurate data on several environmental and climactic variables affecting their crops without have to depend on manual data collection or power draining WiFi devices with high duty cycles, that make deployment of remote sensors impracticable.

The embodiments described herein also have several "green-tech" or "clean-tech" friendly applications, especially when it comes to environmental monitoring of variables affecting the earth's ecosystem, and the development and regulation of industrial processes that effect the environment. In an ever increasing industrialized world, the levels of atmospheric carbon dioxide and other green house gases are increasing. The high level of carbon emissions is believed to be contributing to global warming, the depletion of the ozone layer, the increase in solar radiation, the melting of polar ice caps, the rise in ocean temperatures, climate change and the general disruption of earth's natural flora and fauna. Due to the fact that environmental change is gradual, and industrial, natural and general climactic changes have to be monitored constantly over long range periods, it is advantageous to have a variety of WSNs that can take accurate measurements globally. Such distributed WSNs should be capable of monitoring factors, including but not limited to water levels, air pollution levels, ozone levels, temperature levels and carbon dioxide levels. According to embodiments of the present invention WSNs can be implemented and deployed on a large scale with long durations of measurement and data processing compared to conventional systems. The 802.11-compliant communication protocol described in embodiments of the present invention allows sensor networks to be deployed and monitored in remote geographic areas (such as the north and south pole) for long durations without having to swap out the power supply. This will enable constant and long term environmental monitoring of several environmental factors across a range of environments, terrains and geographic locations.

Urban air pollution or traffic monitoring is an another example where the application of WSN technology is beneficial. Air pollution, in most cities is caused by traffic. Hence the level of pollution depends on the traffic trespassing that road. In order to monitor a district of a city, distributed sensor measurements are necessary. In this case WSN equipped sensor nodes could be fixed to lampposts along the roads. There would be an almost line of sight between the nodes and in such way that high communication ranges are achievable. In addition dedicated sensors also can be attached, such as a special camera to measure the traffic level. With the combination of these two measurements pollution level is predictable. In case of such alerts it would be faster to trigger pollution alerts in big cities and close only certain parts of the city from traffic.

The feedback from the WSNs networks can be put to practical, economic and regulatory uses. For example, data from distributed WSNs across major cities or regions of a country can provide valuable information to environmental agencies, international organizations, and governmental bodies concerning the amount of acceptable (or legal) carbon or other emissions in any given area.

What is claimed is:

1. A method of operating a communication node in a communication network, comprising:
providing electrical power from a power supply unit of the communication node to a power management unit of the communication node;
activating, by the power management unit, at a designated time, a sensor control unit of the communication node and acquiring data provided by a sensor controlled by the sensor control unit, said data being buffered by the power management unit;
placing the sensor control unit in an off state and powering up, at the direction of the power management unit, a computing and storage unit of the communication node;
transferring the data from the power management unit to the computing and storage unit and storing the data in a memory accessible by the computing and storage unit;
at a designated time for communication of the data, under the control of the power management unit, placing an 802.11-compliant communication protocol communication adapter of a communication unit of the communication node in an operational state and transmitting the data from the computing and storage unit to another node of the communication network and subsequently placing the communication unit in an off state; otherwise,
placing the computing and storage unit in an off state.

2. The method of claim 1, wherein the off state is replaced by a low power consumption state.

3. The method of claim 1, wherein prior to the communication unit transmitting the data from the computing and storage unit to another node of the communication network, synchronizing a real time clock of the power management unit with a master clock of a node of the communication network.

4. The method of claim 3, wherein the synchronization is performed using a network time protocol.

5. The method of claim 3, wherein the master clock is selected according to a selection protocol.

6. The method of claim 1, wherein prior to placing the computing and storage unit in an off state, storing data received from another node in the communication network.

7. The method of claim 1, wherein prior to transmitting the data, constructing a routing table of other nodes in the communication network.

8. The method of claim 1, wherein the total duty cycle of the 802.11-compliant communication protocol is 1% or the duty cycle of conventional 802.11 compliant devices.

9. The method of claim 1, wherein the total duty cycle of the 802.11-compliant communication protocol is between the range of 3%-1% of the duty cycle of conventional 802.11 compliant devices.

10. The method of claim 1, wherein the total duty cycle of the 802.11-compliant communication protocol is between the range of 0.006%-0.3% of the duty cycle or conventional 802.11 compliant devices.

11. The method of claim 1, wherein an 802.16 compliant communications protocol is used in lieu of the 802.11 compliant communications protocol.

12. The method of claim 1, wherein prior to transmitting the data, reusing routing tables form previous communications.

13. The method of claim 1, wherein prior to synchronizing a real time clock of the power management unit with a master clock of a node of the communication network, transmitting the data from the computing and storage unit to another node of the communication network.

* * * * *